United States Patent [19]

Virnig et al.

[11] Patent Number: 5,968,364

[45] Date of Patent: *Oct. 19, 1999

[54] PROCESS FOR THE REMOVAL OF TOXIC CYANIDE AND HEAVY METAL SPECIES FROM ALKALINE SOLUTIONS

[75] Inventors: Michael J. Virnig, Tucson, Ariz.; Phillip L. Mattison, North Wales, Pa.; George A. Wolfe; J. Michael Sierakoski, both of Tucson, Ariz.; J. Murdoch Mackenzie, Gisborne, Australia; Keith E. Weerts, Windsor, Calif.

[73] Assignee: Henkel Corporation, Gulph Mills, Pa.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/722,912

[22] Filed: Sep. 27, 1996

Related U.S. Application Data

[63] Continuation-in-part of application No. 08/644,927, May 10, 1996, abandoned, which is a continuation-in-part of application No. 08/033,677, Mar. 16, 1993, Pat. No. 5,522,997.

[51] Int. Cl.[6] .................................................. B01D 11/04
[52] U.S. Cl. ............................................. 210/638; 210/634
[58] Field of Search ................................. 210/634, 638; 75/722, 744

[56] References Cited

U.S. PATENT DOCUMENTS

| | | | |
|---|---|---|---|
| 4,026,790 | 5/1977 | Moore | 423/99 |
| 4,267,159 | 5/1981 | Crits | 75/105 |
| 4,321,145 | 3/1982 | Carlson | 210/177 |
| 4,708,804 | 11/1987 | Coltrinari | 210/677 |
| 4,732,609 | 3/1988 | Frey et al. | 423/24 |
| 4,814,007 | 3/1989 | Lin et al. | 75/118 R |
| 4,842,935 | 6/1989 | Shinbo | 210/656 |
| 4,895,597 | 1/1990 | Lin et al. | 75/118 R |
| 4,992,200 | 2/1991 | Lin et al. | 252/184 |
| 5,028,259 | 7/1991 | Lin et al. | 75/722 |
| 5,158,603 | 10/1992 | Stierman et al. | 75/743 |
| 5,198,021 | 3/1993 | Virnig | 75/744 |
| 5,368,736 | 11/1994 | Horwitz | 210/635 |
| 5,411,575 | 5/1995 | Fleming | 75/743 |
| 5,478,445 | 12/1995 | Barker | 204/86 |
| 5,522,997 | 6/1996 | Virnig | 210/638 |
| 5,607,619 | 3/1997 | Dadgar | 252/187.2 |

FOREIGN PATENT DOCUMENTS

WO 92/14865  9/1992  WIPO ................................... 210/638

OTHER PUBLICATIONS

Kirk–Othmer Encyclopedia of Chemical Technology, Frank F. Alan,, PA State U., vol. 10 "Flotation" pp. 523–547 (1980).

Randol Forum, Perth '95, "New Ion Exchange Polymers for Gold Cyanide Recovery" Mar. 1995, pp. 433–438.

B. R. Green and A. H. Potgeiter, "Unconventional Weak–Base Anion Exchange Resins, Useful For The Extraction of Metals, Especially Gold", D. Naden and M. Streat (Eds.), *Ion Exchange Technology*, Soc. Chem. Ind., London, 1984, pp. 626–636.

A. H. Schwellnus and B. R. Green, "Structural Factors Influencing The Extraction Of Gold Cyanide By Weak–Base Resins", M. Streat, Ed., *Ion Exchange for Industry*, Ellis Horwood Ltd., West Sussex, England, 1988, pp. 207–218.

A. H. Schwellnus and B. R. Green, "The Solvent Extraction Of Gold Cyanide By Lauroimidazoline", *Solvent Extraction And Ion Exchange*, 8(2), 1990, pp. 223–240.

B. R. Green, "Mechanisms Of Loading Of Metal Cyanides By Weak–Base Resins", *Reactive Polymers*, 8, 1988, pp. 221–234.

*Primary Examiner*—Ernest G. Therkorn
*Attorney, Agent, or Firm*—Ernest G. Szoke; Wayne C. Jaeschke; Patrick J. Span

[57] ABSTRACT

Toxic cyanide and anionic metal species are removed from aqueous alkaline solutions by contacting the aqueous alkaline solutions with an extractant compound which is capable of being protonated at a pH of 9 or above. Whereby the anionic metal species is extracted from the aqueous alkaline solution, subsequently stripping the metal values from the extractant and recovering the metal species, preferably by electrowinning. The process is useful in a flotation process in which a recycled aqueous process stream is employed in that the toxic cyanide ion and anionic metal species are removed prior to recycling of the aqueous process stream for flotation.

23 Claims, No Drawings

PROCESS FOR THE REMOVAL OF TOXIC CYANIDE AND HEAVY METAL SPECIES FROM ALKALINE SOLUTIONS

This application is a continuation-in-part of Ser. No. 08/644,927, filed May 10, 1996, now abandoned, which is a continuation-in-part of Ser. No. 08/033,677, filed Mar. 16, 1993, now U.S. Pat. No. 5,522,997, the entire contents of which is hereby incorporated by reference.

BACKGROUND OF THE INVENTION

1. Field of the Invention

This invention relates to an improved process for the removal of toxic cyanide and anionic metal species from alkaline solutions resulting from the mining and plating industries and to a process of flotation wherein recycled aqueous process stream water is employed to disperse a finely divided ore to provide a finely divided pulp, the recycled process stream water is an aqueous alkaline process stream from which toxic cyanide ion, anionic metal cyanide complexes or anions of arsenic or selenium have been removed.

2. Description of the Related Art

Gold occurs primarily as the native metal, alloyed with silver or other metals or as tellurides. It is commonly associated with the sulfides of iron, silver, arsenic, antimony and copper. Silver occurs as finely disseminated metal in rocks of hydrothermal origin as silver chloride, sulfide or tellurides and as complex sulfides with antimony and arsenic. Historical practice with ores containing native metal involve crushing, concentration of the gold or silver by gravity separation and recovery by amalgamation with mercury. Environmental concerns have resulted in abandonment of this process in most cases.

Two processes, heap leaching and carbon-in-pulp (CIP), are used for the recovery of gold from ore depending to a large extent on the grade and nature of the ore. Both processes result in waste streams consisting of dilute solutions containing low levels of cyanide, metal cyanide complexes, and depending on the ore, other toxic metal species such as arsenate or selenate. Low grade ores consisting of gold disseminated in largely siliceous rock are typically leached by piling the crushed ore on specially prepared pads to a depth of several feet and then continuously distributing an aqueous cyanide solution across the surface of the heap. As the cyanide solution trickles through the ore, the gold is leached from the ore as the soluble aurocyanide species. The gold bearing leach solution is collected at the bottom of the heap and pumped to a treatment facility for recovery of the gold. When the gold tenor in the leach solution drops to the point where it is no longer economically feasible to treat the ore, leaching is stopped and the heap is abandoned. At this point, the heap is saturated with dilute aqueous cyanide solution containing various other metal cyanide complexes as well as potentially other toxic metal species. This solution must be washed from the heap and treated to destroy the various cyanide species and remove the remaining toxic metal species. If the heap is not washed, these cyanide species and toxic metal species will continue to leach from the heap over time, resulting in an environmental threat to wildlife and groundwater.

There are many gold ore bodies in the world which contain gold as free gold metal together with gold associated with pyrite. The gold associated with pyrite is not amenable to recovery by direct cyanide leaching of the ore. The free gold, however, can be recovered by grinding the ore and leaching it with cyanide and recovering gold from the leach using activated carbon technology, or more recently ion exchange polymer technology for gold cyanide recovery as reported in "New Ion Exchange Polymers for Gold Cyanide Recovery"; Randol Forum, Perth '95. For those bodies containing pyrite a commonly used process is to recover the pyrite plus associated gold by flotation and to cyanide the free gold remaining in the ore. The pyrite is then roasted to expose the associated gold and the roast calcine is leached with cyanide to recover gold. Flotation is a process for concentrating the metal values as their sulfides from a sulfide ore into a concentrate that can be further treated by other processes such as smelting to recover the metals themselves. A general description of flotation can be found in the Encyclopedia of Chemical Technology (ECT) by Frank F. Aplan of The Pennsylvania State University, in Vol. 10, pp. 523–547.

In many parts of the world where flotation plants are located, availability of water for mineral processing is a major issue. In these arid regions, it is desirable to recycle the process water. During certain stages, cyanide may be added as a depressant as discussed in the ECT article. The cyanide, thiocyanate, and base metal cyanide complexes all report to the tailings dam water. Also the location on one metallurgical site of both cyanide leach operations and pyrite flotations means that the process waters used in pyrite flotation may become contaminated with free cyanide and associated thiocyanate and base metal cyanide anion complexes. These cyanide species are depressants for pyrite during flotation and it is desirable to remove the cyanide ion and the anionic cyanide metal complexes from the process water before the process water can be used in pyrite flotation. After treatment to remove the cyanide ion and anionic metal species cyanide complexes or anions of arsenic or selenium, the resultant purified water can then be returned to the flotation process.

Higher grade ores or ores in which the gold is locked in a matrix which is not easily leached are treated by CIP processes. The ore is finally ground and placed in a leaching vessel containing alkaline cyanide solution and carbon. The gold is adsorbed by the carbon as it is leached. The spent slurry is then subjected to a series of solid/liquid separation steps before being deposited in a tailings dam as a thickened slurry. Water continues to separate over time from these tailings. This water contains low levels of cyanide and metal cyanide species. It must be treated prior to discharge into the environment or before return to the leaching or flotation process. Alternatively, the thickened slurry can be treated by contacting with a solid phase adsorbent prior to discharge to the tailings bond to remove the cyanide and anionic metal species.

In both cases, the levels of cyanide species and toxic metals such as arsenic and selenium are very low, 1–10 ppm. In order to achieve essentially complete removal by standard oxidation processes with hydrogen peroxide or hypochlorite and precipitation processes, large excesses of reagents are required. If the toxic species can be concentrated, then treatment can be carried out much more efficiently with considerable savings in reagent costs.

Similarly, spent electroplating solutions and rinse solutions containing heavy metal cyanides such as zinc cyanide or cadmium cyanide are often dilute, requiring large excesses of reagents for their removal. Concentration of these species would also allow savings in reagent costs.

SUMMARY OF THE INVENTION

The surprising discovery has been made that the waste streams associated with heap leaching or carbon-in-pulp processing of ores or flotation aqueous process streams can be concentrated by contacting the aqueous waste streams with an extractant which is a compound which is capable of being protonated at a pH of 9 or above. The extractant can contact the waste stream in a variety of ways such as when it is dissolved in an organic phase or when it is part of a solid phase such as when it is adsorbed on activated carbon or in the form of an ion exchange resin functionalized with the extractant. The waste streams have a pH value of from 7.5 to 10, or they are adjusted to have a pH value of from 7.5 to 10. A compound which is capable of being protonated at a pH of 9 or above can be a guanidine compound of the formula I

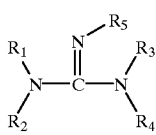

I wherein $R_1$ through $R_5$ are selected from the group consisting of H, and aromatic and aliphatic hydrocarbon groups containing from 1–25 carbon atoms such that the total number of carbon atoms in the total of $R_1$–$R_5$ is at least 12 or a mixture of quaternary amine and an alkyl phenol. Both of these types of compounds are dissolved in a water-immiscible solvent in order to extract a major portion of all, or both, of the cyanide species and the toxic metal species to give a clean raffinate that can be used for washing the heap or tailings to remove additional cyanide species. The use of clean aqueous solutions greatly speeds up the washing operation resulting in significant savings in remediation costs. Since gold mining operations are typically located in arid regions, the process according to the invention also conserves precious process water. The loaded organic phase can then be stripped by contacting it with an aqueous caustic solution. The stripped organic can then be returned to extraction. By adjusting the ratio of the loaded organic phase to the strip solution and multiple recycle of the aqueous strip solution, concentration factors of 10–1000 can be achieved. The resultant concentrated aqueous can then be treated by a number of known processes to destroy the cyanide species and precipitate the heavy metals for disposal.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about".

For purposes of the present invention, cyanide species are defined as cyanide ions and metal cyanide complexes, which are also known as anionic metal species, examples of which include $Cu(CN)_3^{-2}$, $Cu(CN)_2^-$, $Zn(CN)_4^{-2}$, $Hg(CN)_2^-$, and the like.

A number of essentially water-immiscible liquid hydrocarbon solvents can be used as the organic phase in the process according to the invention. These include: aliphatic and aromatic hydrocarbons such as kerosene, benzene, toluene, xylene and the like. A choice of the essentially water-immiscible liquid hydrocarbon solvents for particular commercial operations will depend on a number of factors, including the design of the solvent extraction plant (i.e. mixer-settler units, Podbielniak extractors, etc.), the value of the metal being recovered, and the like. Representative commercially available solvents are Kermac® 470B (an aliphatic kerosene available from Kerr-McGee-flash point 175° F.), Chevron ion exchange solvent (available from Standard Oil of California-flash point 195° F.), Escaid® 100 and 110 (available from Exxon-Europe-flash point 180° F.), Norpar® 12 (available from Exxon-USA-flash point 160° F.), Conoco-C1214 (available from Conoco-flash point 60° F.), Aromatic 150 (an aromatic kerosene available from Exxon-USA-flash point 150° F.), the various other kerosenes and petroleum fractions available from other oil companies.

The extractants which can be used in the process according to the invention are those which are pH dependent, that is, those which are protonated at a lower pH to provide a cation capable of extracting an anion, and which are deprotonated at a higher pH to permit stripping of the extracted anion. The extractants are strongly basic compounds, capable of being protonated at a pH of 9 or above. Preferably, the extractants are capable of being protonated at a pH of 10 or above.

The quaternary amines which can be used in the process according to the invention are those having the formula II

II wherein $X^-$ is an anion, each of $R_6$, $R_7$, $R_8$, and $R_9$ is a hydrocarbon radical containing up to 25 carbon atoms, and wherein the sum of carbon atoms in the total of $R_6$, $R_7$, $R_8$, and $R_9$ is at least 16. Preferably at least one of $R_6$, $R_7$, $R_8$ and $R_9$ groups will have at least 6 carbon atoms and no more than 2 of $R_6$, $R_7$, $R_8$ and $R_9$ groups will be methyl. The preferred quaternary amine is one in which three of $R_6$, $R_7$, $R_8$, and $R_9$ groups are alkyl groups having at least 6 carbon atoms, such as tri($C_8$–$C_{10}$)methyl ammonium chloride, available from Henkel Corporation as Aliquat® 336.

The alkyl phenols which can be used in the process according to the invention are those having the formula III and IV

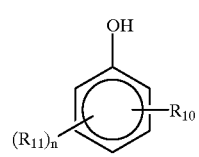

(III)

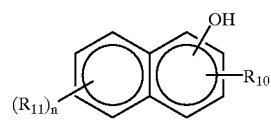

(IV)

wherein $R_{10}$ is hydrogen or an electron-withdrawing group selected from the group consisting of Cl, Br,

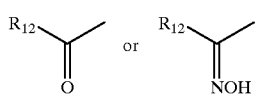

wherein $R_{12}$ is hydrogen or a
hydrocarbon radical having from 1 to 25 carbon atoms with the proviso that the total number of carbon atoms in $R_{11}$ and $R_{12}$ is from 6 to 30; n is an integer from 0 to 4; and $R_{11}$ is an alkyl group having from 1 to 25 carbon atoms, preferably from 7 to 12 carbon atoms. The preferred phenols are heptylphenol, octylphenol, nonylphenol, and dodecylphenol. The preferred quaternary amine is Aliquat® 336.

The guanidine compounds which can be used as the extractants according to the invention are those which are soluble in the essentially water-immiscible liquid hydrocarbon organic phase solvents disclosed above. Such compounds will be those of the formula I

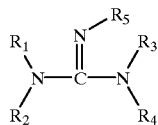

wherein $R_1$ through $R_5$ are selected from the group consisting of H, and aromatic and aliphatic hydrocarbon groups containing from 1–25 carbon atoms such that the total number of carbon atoms in the total of $R_1$–$R_5$ is at least 12, and at least one of the groups $R_1$ through $R_5$ has at least 6 carbon atoms. More preferably the total number of carbon atoms in the total of $R_1$–$R_5$ is at least 20. The preferred guanidine is N,N'-bis(cyclohexyl)-N"-isotridecylguanidine.

The compound which is capable of being protonated at a pH of 9 or above can contact the waste stream or aqueous process stream in a variety of ways such as when it is dissolved in an organic phase as set forth above or when it is part of a solid phase such as when it is adsorbed on activated carbon or unfunctionalized polymer beads such as a polystyrene-divinylbenzene resin, or in the form of an ion exchange resin functionalized with the compound. For example, one preferred method of carrying out the process according to the invention comprises contacting the aqueous process stream with an ion exchange resin functionalized with a compound which is capable of being protonated at a pH of 9 or above. Such functionalized resins can be made by the procedure set forth in Example 13. In addition to a compound of formula I, the compounds which are capable of being protonated at a pH of 9 or above that can be used to functionalize an ion exchange resin as set forth in Example 13, include imidazole, 2-(2-aminoethyl)-imidazole, and imidazoline.

Another preferred method of carrying out the process according to the invention comprises contacting the aqueous waste streams with a compound having a $pK_a$ greater than 9 and less than 13.5 as set forth above adsorbed onto activated carbon or activated charcoal. Such materials can be made by the procedure set forth in Example 14.

Yet another embodiment of the process according to the invention addresses a problem encountered when a strongly basic compound is used as an extractant. For example, when such an extractant is contacted with an aqueous solution having an initial pH of 9.5, the extractant becomes protonated and can thus raise the pH of the aqueous solution to 11 or even over 12. Under these conditions, the efficiency of extraction of certain anions decreases. The general reaction is shown in Equation A:

$$B+X^-+H_2O \rightarrow BH^+X^-+OH^- \quad \text{(Eq. A)}$$

where B is the strongly basic extractant and $X^-$ is the extractable anion. Use of a greater volume of organic phase or a higher concentration of extractant to obtain more complete anion extraction is hindered because the greater amount of extractant raises the pH even more.

In order to prevent this decreased extraction efficiency, the extractant phase is pre-equilibrated by first contacting it with an aqueous buffer pre-wash solution having a pH between about 8.5 and about 10.5. Any buffer may be used which is capable of supplying a proton between pH 8.5 and 10. However, the preferred buffer is a mixture of carbonate and bicarbonate ions. When the pre-equilibrated extractant phase is subsequently contacted with the alkaline solution containing an extractable anion, the pH remains in a range suitable for efficient extraction. In effect, the reactions taking place in Equation A are separated into two reactions, an acid-base reaction of Equation B and an anion exchange reaction of Equation C.

$$B+2HCO_3^- \rightarrow BH^+HCO_3^-+CO_3^- \quad \text{(Eq. B)}$$

$$BH^+HCO_3^-+X^- \rightarrow BH^+X^-+HCO_3^- \quad \text{(Eq. C)}$$

This separates the effect of increasing pH from the amount of extractant used, and allows better optimization of extraction conditions.

The pre-equilibration embodiment according to the invention as set forth above can be used in any process for extracting anions from an alkaline aqueous solution with an extractant phase containing a highly basic extractant such as a compound which is capable of being protonated at a pH of 9 or above. In such a process, the first step comprises contacting the extractant phase with an aqueous solution of a buffer having a pH between 8.5 and 10.5. The buffered extractant phase is then separated from the aqueous buffer solution, and the buffered extractant phase then contacts the alkaline aqueous solution to extract the anions. The pH of the aqueous buffer solution after the pre-equilibration step can be restored to its original value by adding acid, and recycling for further contact with extractant phase. In the case of a carbonate-bicarbonate buffer, the acidification may be done by adding carbon dioxide.

The following examples are meant to illustrate but not limit the invention.

EXAMPLE 1

Extraction of Silver by Non-Equilibrated Guanidine Extractant

An organic solution was prepared to contain 0.0059 M BCHTG (N,N'-bis(cyclohexyl)-N"-isotridecyl guanidine) and 50 g/L TDA (tridecyl alcohol, available from Exxon) in Aromatic 150 (an aromatic kerosene available from Exxon). Portions of organic were contacted by shaking for 30 min with Cyanide Feed Solution #1 in organic/aqueous volume ratios of 1/1, 2/1, and 5/1. Cyanide Feed Solution #1 contained 246 mg/L Zn, 52 mg/L Ag, 46 mg/L Cu, all as cyanide complexes, and low concentration of free cyanide, pH=9.5. Raffinates were analyzed for pH and silver level. Results are given in Table I.

TABLE I

Extraction of Silver by Non-equilibrated Guanidine Extractant

| Organic/Aqueous Volume Ratio | Raffinate pH | Silver, mg/L |
|---|---|---|
| 1/1 | 11.0 | 34.7 |
| 2/1 | 11.3 | 29.4 |
| 5/1 | 11.4 | 20.6 |

This experiment shows that guanidine extractant will extract silver extensively without pre-equilibration or pH control. It also shows that the pH increases as the strongly basic extractant is exposed to the feed solution, increasing more as the amount of reagent exposed increases.

EXAMPLE 2

Extraction of Metal Cyanide Complexes by Non-Equilibrated Guanidine Extractant

An organic solution was prepared to contain 0.002 M BCHTG and 50 g/L TDA in Aromatic 150. Cyanide Feed Solutions #2 & #3 were effluent samples obtained from exhausted gold leach heap pads, and had metal contents (as cyanide complexes) as shown in Table II. One volume of aqueous feed solution was extracted by shaking with two volumes of organic for 15 min, the organic was removed, and the remaining aqueous was extracted a second time with two volume of fresh organic. The final raffinate was analyzed for metal levels. The results are shown in Table II.

TABLE II

Extraction of Metal Cyanide Complexes by Guanidine Extractant

| Aqueous Solution | Gold, mg/L | Silver, mg/L | Zinc, mg/L | Mercury, mg/L |
|---|---|---|---|---|
| #2 Feed | 0.5 | 22.2 | 120 | 1.2 |
| #2 Raffinate | 0.1 | 18.2 | 62.4 | 0.1 |
| #3 Feed | <0.1 | 0.4 | 0 | 1.0 |
| #3 Raffinate | <0.1 | 0.2 | 0 | 0 |

EXAMPLE 3

Extraction of Silver and Zinc by Non-Equilibrated Guanidine Extractant

Organic solutions were prepared to contain respectively 0.004, 0.008 and 0.012 M BCHTG (N,N'-bis(cyclohexyl)-N"-isotridecyl guanidine), 75 g/L TDA in Aromatic 150. Three wash solutions were prepared containing respectively 5% wt $NaHCO_3$ adjusted to pH 10 with 50% wt NaOH, 5% $NaHCO_3$ at an unadjusted pH of 8.1, and 5% wt $Na_2SO_4$ (pH 8.8). Each organic was contacted by shaking 15 min in a separatory funnel with an equal volume of each aqueous wash solution, and the pH of the separated solution was determined. Each washed organic then was used to extract an equal volume of Cyanide Feed Solution #1 by shaking 15 min in a separatory funnel. The aqueous raffinate was filtered, its pH determined, and the remaining zinc and silver was analyzed. Results are shown in Table III.

TABLE III

Effect of Washing Conditions on Zinc & Silver Extraction

| Organic: BCHTG conc. | Aqueous Wash | Post Wash pH | Raffinate pH | [Zn] μg/mL | [Ag] μg/mL |
|---|---|---|---|---|---|
| 0.004M | 5% $NaHCO_3$, pH 10 | 10 | 10 | 114 | 38.4 |
| 0.008M | 5% $NaHCO_3$, pH 10 | 10 | 10.2 | 11.7 | 15.9 |
| 0.012M | 5% $NaHCO_3$, pH 10 | 10 | 10.1 | 1.2 | 2.86 |
| 0.004M | 5% $NaHCO_3$, pH 8.1 | 8.5 | 8.2 | 70.7 | 39.7 |
| 0.008M | 5% $NaHCO_3$, pH 8.1 | 8.4 | 8.0 | 74.3 | 39.0 |
| 0.012M | 5% $NaHCO_3$, pH 8.1 | 8.4 | 7.9 | 79.3 | 39.9 |
| 0.004M | 5% $Na_2SO_4$, pH 8.8 | 9.3 | 10.5 | 127 | 38.3 |
| 0.008M | 5% $Na_2SO_4$, pH 8.8 | 9.7 | 11.3 | 71.5 | 28.7 |
| 0.012M | 5% $Na_2SO_4$, pH 8.8 | 9.6 | 11.5 | 53.1 | 23.8 |

This data shows that pre-equilibration with a non-buffering wash, such as sodium sulfate, has low effectiveness in preventing a pH increase during extraction, resulting in limited effectiveness of zinc and silver extraction. However, equilibration with a alkali-consuming buffer such as bicarbonate at a preferred pH range allows only a negligible pH increase during extraction, with the result that up to 99.5% of zinc and 94.5% of silver are extracted.

EXAMPLE 4

Pre-equilibration Control of Extraction pH with Guanidine Extractant

An organic solution was prepared to contain 0.012 M BCHTG and 75 g/L TDA in Aromatic 150. Aqueous wash solutions were prepared to contain 5% $NaHCO_3$, and were adjusted with 50% NaOH to pH 9.0, 9.5, and 10.5, respectively. As in Example 3, portions of the organic were pre-equilibrated by shaking 15 min in a separatory funnel with the respective aqueous wash solutions, and the pH of the separated aqueous phase was determined. The respective washed organics were then contacted for 15 min in separatory funnels with Cyanide Feed Solution #1. Aqueous raffinates were analyzed for pH, zinc and silver levels. Results, together with corresponding experiments from Table III, are given in Table IV.

TABLE IV

Effect of Equilibration Wash pH on Extraction of Zinc and Silver by BCHTG

| Pre Wash pH | Post Wash pH | Raff pH | [Zn] μg/mL | [Ag] μg/mL |
|---|---|---|---|---|
| 8.1 | 8.4 | 8.0 | 74.3 | 39.0 |
| 9.0 | 9.1 | 8.9 | 0.21 | 2.37 |
| 9.5 | 9.6 | 9.5 | 0.5 | 3.15 |
| 10 | 10 | 10.1 | 1.2 | 2.86 |
| 10.5 | 10.5 | 11.2 | 37.8 | 21.6 |

This data shows that the preferred equilibrium extraction pH range of 9–10 can be attained by pre-equilibration with the proper pH buffer wash solution. It also shows that virtually all the pH change normally associated with the chemistry of extraction has been removed to the pre-equilibration step.

EXAMPLE 5

Multiple Contact Extraction with Pre-equilibrated Guanidine Extractant

An organic solution was prepared to contain 0.008 M BCHTG and 75 g/L TDA in Aromatic 150. A wash solution was prepared to contain 5% $NaHCO_3$, and was adjusted to pH 10.0 with 50% NaOH. The organic phase (3.8 l) was contacted in a separatory funnel with an equal volume of wash solution, giving a washed organic and an aqueous raffinate having pH 9.9. 1.1 L of Cyanide Feed Solution #1 was shaken in a bottle for 15 min with 1.1 L of washed organic. The organic was removed, and a 25 mL aqueous sample was taken for pH, zinc, silver and copper analysis. The remaining aqueous was then shaken 15 min with 1.075 L of washed organic, the phases separated, and another 25 mL aqueous sample was taken. The remaining aqueous was shaken 15 min with 1.05 L of washed organic, the phases separated, and a 525 mL sample of aqueous was taken. The remaining aqueous (525 mL) was shaken 15 min with 525 mL of washed organic, and the phases separated. All aqueous samples were filtered to remove traces of organic. The latter two aqueous samples were also analyzed for WAD (weak acid dissociable) cyanide. Results are shown in Table V.

TABLE V

Effect of Repetitive Contacts on Metal and Cyanide Extraction by Pre-equilibrated 0.008M Guanidine Extractant

| Contact | Raff pH | [Zn] μg/mL | [Ag] μg/mL | [Cu] μg/mL | WAD Cyanide μg/mL |
|---|---|---|---|---|---|
| 1 | 10.1 | 24.9 | 22.0 | 27.4 | — |
| 2 | 10 | 0.3 | 1.76 | 2.41 | — |
| 3 | 9.7 | <0.1 | 0.11 | 0.39 | 2.9 |
| 4 | 9.7 | <0.1 | <0.2 | 0.16 | 2.0 |

This experiment shows that pre-equilibrated organic does not raise the pH of extraction even after several contacts, and that high extraction levels can be attained. Removal effectiveness was <99.95% for zinc, <99.6% for silver, and <99.6% copper, and WAD cyanide was reduced to 2.0 ppm.

EXAMPLE 6

Multiple Contact Extraction with Non-equilibrated Quat-Phenol Extractant

An organic solution was prepared to contain 0.012 M Aliquat® 336 (trialkylmethylammonium chloride, wherein the alkyl group is a mixture of straight-chain octyl and decyl groups, available from Henkel Corporation), 0.03 M nonylphenol (available from Schenectady Chemicals, Inc.), and 50 g/L TDA in Aromatic 150. The organic solution was first washed with an equal volume of 1M NaOH to remove chloride and convert the extractant to the quat-phenoxide ion pair. A volume of the washed organic was then contacted in a separatory funnel with equal volumes of Cyanide Feed Solution #1 for 15 min, and a sample of the raffinate was taken for determination of pH, and zinc & silver levels. The remaining aqueous was contacted again with an equal volume of fresh washed organic, and the raffinate sampled as above. This was repeated for a total of four contacts. Results are given in Table VI

TABLE VI

Effect of Multiple Contacts on Metal Extraction by Non-equilibrated 0.012M Aliquat ®336, 0.03M Nonylphenol

| Contact | Raffinate pH | [Zn] μg/mL | [Ag] μg/mL |
|---|---|---|---|
| 1 | 11.7 | 48.8 | 28 |
| 2 | 12.3 | 17.9 | 14.2 |
| 3 | 12.4 | 7.6 | 6.8 |
| 4 | 12.4 | 3.6 | 2.9 |

This data shows that unequilibrated Quat-Phenol extractant will give extensive extraction of zinc (98.5%) and silver (94.4%), despite the increase in pH from 9.5 to 12.4.

EXAMPLE 7

Extraction of Silver and Zinc by Pre-equilibrated Quat-Phenol Extractant

Three organic solutions were prepared to contain respectively 0.004 M Aliquat® 336 and 0.01 M nonylphenol, 0.008 M Aliquat® 336 and 0.02 M nonylphenol, and 0.012 M Aliquat® 336 and 0.03 M nonylphenol, all with 50 g/L TDA in Aromatic 150. Each organic solution was contacted with an equal volume of 1M NaOH to remove chloride and convert the extractant to the quat-phenoxide form. Aqueous wash solutions were prepared to contain 5% NaHCO$_3$, and were adjusted with 50% NaOH to pH 8.5, 9.0, 9.5, and 10.0. Each of the organic solutions were pre-equilibrated by contacting with an equal volume of pH 10 wash solution. In addition, portions of the 0.012 M Aliquat® 336, 0.03 M nonylphenol organic were also contacted with the pH 8.5, 9.0 and 9.5 wash solutions. Each of the pre-equilibrated organics was then used to extract an equal volume of Cyanide Feed Solution #1 by contacting in a separatory funnel for 15 min. Raffinate (Raff) from each extraction was analyzed for final pH, zinc and silver levels. Results are shown in Table VII.

TABLE VII

Effect of Pre-equilibration on Zinc and Silver Extraction by Quat-Phenol Extractant

| Organic | Wash pH Before | Wash pH After | Raff pH | Zn] μg/mL | [Ag] μg/mL |
|---|---|---|---|---|---|
| 0.004M Aliquat ®336 0.01M Nonylphenol | 10 | 10.1 | 10 | 111 | 42.6 |
| 0.008M Aliquat ®336 0.02M Nonylphenol | 10 | 10.1 | 10.4 | 23.9 | 29.2 |
| 0.012M Aliquat ®336 0.03M Nonylphenol | 1.0 | 10.1 | 10.5 | 2.8 | 12.0 |
| 0.012M Aliquat ®336 0.03M Nonylphenol | 9.5 | 9.5 | 9.7 | 0.5 | 4.8 |
| 0.012M Aliquat ®336 0.03M Nonylphenol | 9.0 | 9.1 | 9.1 | 0.4 | 3.0 |
| 0.012M Aliquat ®336 0.03M Nonylphenol | 8.5 | 8.7 | 8.6 | 0.3 | 2.1 |

Along with the results in Table VI, this data shows the ability of pre-equilibration to maintain a relatively stable pH in extraction despite a tripling of reagent concentration, producing raffinates lower in zinc than after four repetitive contacts with unequilibrated organic of the same concentration. In addition, pre-equilibration permits control of the raffinate pH to a range optimum for metal extraction, giving up to 99.9% zinc and 96% silver extraction in a single contact.

EXAMPLE 8

Multiple Contact Extraction with Pre-equilibrated Quat-Phenol Extractant

Organic solutions were prepared to contain 0.008 M Aliquat® 336, 0.02 M nonylphenol with 50 g/L TDA in Aromatic 150, with 50 g/L TDA in Escaid 110 (a non-aromatic kerosene, available from Exxon), and without TDA in Escaid 110, respectively. Each organic was first washed with an equal volume of 1 M NaOH, and then washed with an equal volume of 5% NaHCO$_3$ which had been pre-adjusted with 50% NaOH to pH 9.0. Each organic was then contacted by stirring for 15 min with an equal volume of Cyanide Feed Aqueous #1, and a sample of the raffinate was analyzed for pH and zinc & silver levels. The remaining raffinate in the Aromatic 150 case was contacted an additional three times with fresh pre-equilibrated Aromatic 150 organic, and the raffinate analyzed after each contact. The Aromatic 150 organic from the first extraction was subsequently stripped by contact with an equal volume of 1M NaOH, and the final aqueous was analyzed for zinc and silver levels. Results are shown in Table VIII.

TABLE VIII

Effect of Repetitive Contacts on Zinc and Silver Extraction by Pre-equilibrated Quat-Phenol Extractant

| Diluent | Description | Raffinate pH | Zinc, mg/L | Silver, mg/L |
|---|---|---|---|---|
| Aromatic 150 | 1st Extraction | 9.1 | 0.65 | 26.7 |
| Aromatic 150 | 2nd Extraction | 8.8 | <0.1 | 0.4 |
| Aromatic 150 | 3rd Extraction | 8.7 | <0.1 | <0.2 |
| Aromatic 150 | 4th Extraction | 8.8 | <0.1 | <0.2 |
| Aromatic 150 | Strip of 1st Extraction | — | 244 | 22.9 |
| Escaid 110 | 1st Extraction | 8.7 | 9.8 | 29.0 |
| Escaid 110, no TDA | 1st Extraction | 9.0 | 7.0 | 38.0 |

This experiment shows that multiple contacts by quat-phenol extractant, pre-equilibrated to a preferred pH, is capable of removing zinc and silver to less than detectable levels while maintaining raffinate pH relatively constant. Stripping with 1M NaOH gives essentially complete recovery of extracted metals. Changing from an aromatic diluent to a non-aromatic diluent, as well as omitting TDA modifier, affects extraction differently for different metals, but still gives effective extraction.

EXAMPLE 9

Continuous Extraction of Metals By A Guanidine Extractant

The removal of cyanide as well as anionic metal species, such as base metal cyanide complexes, selenite, and selenate from a typical aqueous effluent from a spent gold heap leach was carried out in a continuous solvent extraction process. The aqueous feed solution (0.87 gal/min) was pumped directly from a sump at an existing mine site in Nevada to a solvent extraction circuit consisting of 3 stages of extraction and 3 stages of stripping. Each stage is represented by a standard mixer settler unit. In extraction, the aqueous feed was contacted in a counter current fashion with an organic phase containing 0.0037 m/l of $N,N^1$-bis(cyclohexyl)-$N^{11}$isotridecyl guanidine (an alkylguanidine) in Exxon Aromatic 150, an aromatic kerosene, also containing 75 g/L of isotridecyl alcohol at a ratio of 1:0.85 of organic phase to aqueous feed with a mixer retention time of 2 minutes to generate an aqueous raffinate stream containing greatly reduced levels of cyanide and anionic metal species. (See Table IX). The loaded organic phase was continuously contacted with a 1 M sodium hydroxide solution to strip the cyanide and anionic metal species from the organic phase, regenerating the organic phase for reuse in extraction. The ratio of organic phase to aqueous phase in stripping was 131/1 with sufficient aqueous recycle to maintain an organic to aqueous ratio of 1:1 in the mixer. The cyanide and anionic metal species were concentrated in the aqueous strip solution. The results are given in Table IX.

TABLE IX

Continuous Extraction with Guanidine Extractant

| Solution | pH | Au mg/L | Ag mg/L | Hg mg/L | Cu mg/L | Zn mg/L | Se mg/L | WAD* CN (ppm) |
|---|---|---|---|---|---|---|---|---|
| Feed | 8.9 | 0.44 | 2.07 | 2.75 | 1.90 | 1.50 | 1.7 | 7.5 |
| Raff. | 10.3 | 0.03 | 0.03 | 0.004 | 0.20 | <0.1 | 0.3 | 2.4 |
| Strip Conc. | — | 19 | 103 | 160 | 83 | 205 | 72 | 460 |

*Weak acid dissociable cyanide

Passing the strip concentrate through an electrowinning cell resulted in plating of the metals out of solution and destruction of approximately 75% of the WAD CN.

EXAMPLE 10

Continuous Extraction of Metals by Guanidine Extractant with pH Control

A sample of the aqueous raffinate from extraction in Example 9 was collected, its pH adjusted to 9.0 with carbon dioxide, and then returned to the circuit as aqueous feed. The results are summarized in Table X. The data shows that complete extraction of the cyanide and anionic metal species can be attained.

TABLE X

Table B: Continuous Extraction by Guanidine Extractant with pH Control

| Solution | pH | Au mg/L | Ag mg/L | Hg mg/L | Cu mg/L | Zn mg/L | Se mg/L | WAD* CN (ppm) |
|---|---|---|---|---|---|---|---|---|
| Feed | 9.0 | 0.03 | 0.03 | 0.004 | 0.20 | <0.1 | 0.3 | 2.4 |
| Raffinate | 9.6 | ** | <0.02 | 0.005 | <0.05 | <0.01 | 0.036 | <0.04 |

*Weak acid dissociable cyanide
**Non-detectable

EXAMPLE 11

Continuous Extraction of Metals by Guanidine Extractant

The removal of cyanide as well as anionic metal species, such as the base metal cyanide complexes, from a typical aqueous effluent from a gold heap leach feed is further illustrated by the data summarized in Table XI. The feed was obtained from a mine site. The experiment was carried out in a similar fashion to that described in Example 10.

TABLE XI

| Solution | pH | Au mg/l | Ag mg/l | Ni mg/l | Cu mg/l | Zn mg/l | Se mg/l |
|---|---|---|---|---|---|---|---|
| Feed | 9.7 | 0.65 | 1.44 | 1.33 | 2.89 | 4.13 | 11.0 |
| Raffinate | 11.1 | <0.01 | 0.12 | <0.01 | 1.49 | <0.01 | 0.07 |
| % Extracted | — | 98.5 | 91.7 | 99.2 | 48.4 | 99.8 | 99.4 |

EXAMPLE 12

Continuous Extraction of Metals by Quat-Phenol Extractant

The effluent from a spent heap leach pad of a commercial gold mining operation, at a pH of 7.9, was extracted with a solution of 5.52 g Aliquat® 336 and 6.75 g nonylphenol diluted to 3 liters with Escaid 110. This solution contained 0.0037 molar Aliquat® 336 (at 90% purity) and 0.0102 molar nonylphenol. The organic extractant was washed with 1 M sodium hydroxide solution prior to use. The extraction and strip were conducted in a countercurrent manner in continuous mixer settlers using three stages of extraction and three stages of strip. Both the organic and aqueous flow rates in extraction were 40 ml per minute. In addition, a sufficient amount of the aqueous phase was recycled in E3, the third stage of extraction, to assure that the raffinate exited from the cell in which the aqueous phase in the mixer was continuous in order to minimize organic entrainment. The strip solution consisted of 1.0 M sodium hydroxide which was operated at 100% recycle in each individual cell to maximize concentration effects. After five hours of running the aqueous phases of each cell were analyzed and found to contain the following metal values in parts per million.

TABLE XII

Continuous Extraction by Quat-Phenol Extractant

| Stage | Cu mg/L | Zn mg/L | Au mg/L | Se mg/L | Hg mg/L | Ag mg/L |
|---|---|---|---|---|---|---|
| Feed | 1.2 | <0.1 | <0.1 | 1.7 | 2.8 | 0.7 |
| E1 | <0.1 | <0.1 | <0.1 | 1.1 | 1.1 | <0.1 |
| E2 | <0.1 | <0.1 | <0.1 | 0.5 | 1.4 | <0.1 |
| E3 (raffinate) | <0.1 | <0.1 | <0.1 | 0.4 | 1.2 | <0.1 |
| S1 (strip conc) | 19.6 | 0.9 | 7.0 | 18.5 | 14.4 | 16.1 |
| S2 | 1.5 | 0.7 | 0.1 | 2.0 | 0.9 | 1.0 |
| S3 | 0.2 | 0.6 | <0.1 | 0.4 | 0.2 | <0.1 |

The data show that the metals can be extracted and then concentrated for further treatment.

EXAMPLE 13

Preparation of Guanidine-Functionalized Ion Exchange Resin

A. Polymer Preparation.

A polystyrenic matrix with a cross-linkage of 6% divinylbenzene (DVB) was prepared by the addition polymerization technique. The aqueous phase consisting of water (668 ml), hydroxymethyl cellulose (1.68 g), lignosulfate (1.68 g) and calcium chloride (8.4 g) was stirred while being heated at 87° C. An organic phase (or monomer mixture) which included styrene (240 g), divinylbenzene (25 g; 63.5%), octanoic acid (272 ml) and benzoyl peroxide (BPO; 4.76 g) was mixed until the catalyst (BPO) was dissolved. As soon as the aqueous phase reached 80° C., the organic phase was added to the aqueous mixture while stirring slowly. The stirring rate was then adjusted to obtain the required droplet size. After monomer addition, the reaction temperature went up to approximately 86° C. due to an exothermic reaction. The reaction temperature decreased and was controlled at 80° C. for 17 hours. The resin beads (raw polymer) were collected by filtration and stirred in one liter of 2.5M sodium hydroxide solution (1.5 moles per mol of octanoic acid used during polymerization) at 60° C. for one hour to dissolve the octanoic acid. The resin beads were washed to neutrality and screened between +600 μm and −1000 μm.

B. Chloromethylation

Chloromethylmethylether containing reagent (CMME) was prepared by adding dimethoxymethane (600 ml) dropwise to thionylchloride (500 ml) at a temperature of −7 to 0° C. The mixture was allowed to reach ambient temperature and was then stored in a dry bottle. CMME (17 ml per gram of resin) was added to oven-dried polystyrene beads. Stannic chloride (0.375 ml per gram of resin) was added dropwise to the mixture over 15 minutes. The reaction was carried out at 40° C. for five hours. The reaction mixture was then cooled and the excess of CMME was destroyed by the dropwise addition of methanol until no further reaction took place and then water was added slowly. The beads were filtered off and washed in a column with water until the effluent was neutral.

C. Functionalization With Guanidine

Chloromethylated polystyrene beads (15 g; 98.3 mmol), sodium hydroxide pellets (3.93 g; 98.3 mmol), guanidine (98.3 mmol) and 80 ml of solvent (ethanol or water) were heated at a temperature of 80° C. The aminated resins were thoroughly washed with ethanol and several times with water before being stored in water. The resins were analyzed for their carbon, hydrogen, chlorine and nitrogen contents by the means of a Heraeus Rapid CHN-O-analyzer.

EXAMPLE 14

Preparation of Guanidine on Activated Carbon

A portion of Kopcarb activated coconut carbon (available from Sentrachem) was washed and then dried in an oven to constant weight. A solution of N,N'-bis(cyclohexyl)-N"-isotridecylguanidine (BCHTG) (1.2 g) was prepared in pentane and then 20 g of the dried carbon was added. The slurry was gently stirred for 30 minutes and then the pentane was slowly removed at 45–50° C. under reduced pressure. The BCHTG loaded carbon was then dried at 50° C. in a vacuum oven to constant weight. A total of 22.20 g of impregnated carbon was obtained.

EXAMPLE 15

Extraction of Metal Cyanide Complexes by Equilibrated and Non-Equilibrated Guanidine Impregnated Carbon A portion of the BCHTG impregnated carbon was washed with 50 mls of pH 9.0 NaHCO$_3$ buffer. Two samples of BCHTG impregnated carbon (3.4 g), one pre-equilibrated and the other was not, were then contacted with 25 ml portions of an aqueous solution containing 250 ppm of Zn, 50 ppm of Ag, and 50 ppm of Cu as the cyanide complexes by shaking on a table shaker for 2 hours. The impregnated carbon was then separated from the aqueous raffinate by filtration and the concentration of the metals remaining in the raffinate determined. The metal loaded carbon was then stripped of metals by contacting with 1 M NaOH at 60° C. for 2 hours with very gentle agitation. The impregnated carbon was then removed by filtration and the concentration of the metals in the strip solution determined. The results are summarized in Table XV.

TABLE XV

Extraction and Stripping of Metal Cyanides by Carbon Supported Guanidine Extractants

| | Sample ID | [Zn] μg/ml | [Ag] μg/ml | [Cu] μg/ml | pH |
|---|---|---|---|---|---|
| | Feed | 250 | 49.7 | 46.4 | 8.98 |
| Extraction | Carbon A | 26.1 | 0.4 | 3.8 | 9.09 |
| | Carbon B | 70.8 | 0.4 | 10.3 | 11.02 |
| Strip | Carbon A | 476 | 2.5 | 69.5 | — |
| | Carbon B | 389 | 1.7 | 53.2 | — |

EXAMPLE 16

Preparation of Guanidine Supported on a Resin

A non-functionalized polymeric resin (XAD 4 available from Rohm & Haas) was placed in a column. It was then washed thoroughly with water by passing water upflow through the column. The beads were then transferred to a beaker and slurried with methanol and allowed to soak for three days. The beads were then returned to the column, washed with 2.5 bed volumes of methanol, acetone, and then diethyl ether. The resin beads (201 g) were then slurried in a solution containing 20.1 g of N,N'-bis(cyclohexyl)-N"-isotridecylguanidine in ether. The slurry was gently swirled for 1 hour and then the ether was slowly removed under reduced pressure. The guanidine impregnated resin was then dried to constant weight in a vacuum oven to give 226.7 g. The dried resin beads require pre-treatment with 12–13% ethanol in water prior to use to ensure good extraction.

EXAMPLE 17

Extraction of Arsenic by Guanidine or Quat-Phenol Extractants

Organic phase A was prepared by dissolving 0.2025 g of N,N'-bis(cyclohexyl)-N"-isotridecylguanidine in 5 g of tridecanol and then diluting to 100 ml with Aromatic 150 kerosene. Organic phase B was prepared in a similar fashion with 0.222 g of Aliquat® 336 and 0.276 g of nonylphenol. Organic phase B was washed with 0.0125 M NaOH prior to use. Each organic was then contacted, separately, with an equal volume of an aqueous arsenic solution containing $2\times10^{-5}$ moles of arsenate at a pH of 7.75. After shaking for 15 minutes in a separatory funnel, the phases were separated and the aqueous raffinate was analyzed for arsenic content. The results are summarized in Table XVII.

TABLE XVII

Extraction of Arsenic by Guanidine and by Quat-Phenol

| Sample ID | [As] | % Extracted | pH |
|---|---|---|---|
| Feed | 5.9 μg/ml | — | 7.75 |
| Organic A Raffinate | 4.7 | 20.3 | 8.30 |
| Organic B Raffinate | 4.4 | 25.4 | 7.81 |

EXAMPLE 18

Extraction of Heavy Metal Cyanides by Buffer-Washed Guanidine Resin

A 1.95 ml sample (0.575 g.) of guanidine functionalized XE-659 resin (an experimental resin from Rohm and Haas) was thoroughly water washed to remove preservative salts. The beads were then washed into a 4 oz. glass bottle with 50 ml of 5% $NaHCO_3$ which had been previously adjusted to pH 9 with 50% NaOH. The resin and bicarbonate solution were shaken on a table shaker for 2 hours. The bicarbonate-treated resin beads were recovered by filtration and washed with deionized water to remove excess bicarbonate. (The beads were kept slightly moist throughout this handling step.) The pretreated resin beads were charged to a 4 oz. glass bottle along with 50 ml of metal cyanide feed solution containing about 250 ppm Zn, and 50 ppm each of Ag and Cu. The bottle was rotated on a bottle roller at about 100 rpm for 2 hours. The resin beads were then separated from the extraction raffinate on a Buchner filter. The raffinate pH was measured and metal concentrations determined by ICP. Extraction results are summarized in Table XVIII.

TABLE XVIII

Extraction of Hevy Metal Cyanides by Buffer-Washed Guanidine Resin

| Sample | [Zn] mg/L | [Ag] mg/L | [Cu] mg/L | pH Raffinate |
|---|---|---|---|---|
| Feed | 250 | 49.7 | 46.4 | 9.04 |
| Raffinate, $NaHCO_3$ treated resin | 155 | 1.9 | 5.7 | 9.33 |

EXAMPLE 19

Flotation experiments were carried out using three different water qualities: 1) detoxified plant water obtained by treating a sample of the plant water using the INCO $SO_2$/air process to remove all cyanide species, 2) a sample of plant water after extraction with 0.012 M N,N'-bis(cyclohexyl)-N"-isotrideoylguanidine in a kerosene diluent containing 75 gram per liter of isotridecyl alcohol at an organic to aqueous (O/A) ratio of 2:1 to remove a portion of the cyanide species, and 3) a sample of untreated plant water. Table XIX summarizes the effects of contacting the plant water at different organic to aqueous (O/A) ratios on the level of residual cyanide in the treated water in terms of total cyanide, weak acid dissociable (WAD) cyanides, and free cyanide-WAD cyanides are species, such as, $Zn(CN)_4^{-2}$; $Cu(CN)_3^{-2}$; $Cu(CN)_2^{-1}$; $Ni(CN)_4^{-2}$ etc.

TABLE XIX

| Plant Water | Tot. CN (mg/l) | WAD CN (mg/l) | Free CN |
|---|---|---|---|
| "As received" | 33 | 5.8 | 1.2 |
| O/A = 1 | 20 | 3.4 | 0.6 |
| O/A = 2 | 15 | 2.2 | 0.6 |
| O/A = 5 | 11 | 1.6 | 0.6 |

A preferred electrowinning means having electrolyte flow parallel to the cathode is the cell illustrated in FIG. 3 of patent application WO 92-14865 which is hereby incorporated by reference along with the text of the specification describing FIG. 3. In this cell, the cathode comprises a thin-walled cylindrical tube, the anode comprises a rod, preferably a carbon rod, positioned at the axis of the tube, and caps at either end of the tube incorporate inlet and outlet means which are positioned perpendicular to the tube axis and tangential to the tube surface so that a spiral motion is imparted to the electrolyte flowing through the tube. A direct electric current is applied between the anode and cathode, and the conditions of the spiral flow pattern allow operation at increased current density and lower copper concentrations. Flow rates will depend on the exact geometry and dimensions of the cell, but preferably the electrolyte will pass longitudinally along the axis of the cell with a velocity of between about 0.5 and about 10 meters per minute. More preferably the longitudinal velocity of electrolyte will be from about 6 to about 8.5 meters per minute. For a cell 10 cm in diameter, the preferred velocity corresponds to a volumetric flow rate of between about 4 and about 80 liters per minute, with a more preferable flow rate of about 50 to about 70 liters per minute. Due to the spiral motion of the electrolyte in the cell, the actual velocity of electrolyte relative to the cathode surface will be substantially greater than the longitudinal velocity along the axis of the cell. Electrolyte may be recirculated through the cell to obtain the desired flow rates.

The cell may be further modified by insertion of a cation exchange membrane between the anode and the cathode, separating the cathode and anode.

The ore was a sulfide ore in which gold is associated with the sulfide. The ore was ground to an average particle size of 0.106 mm in diameter in the presence of the selected water source to produce a slurry containing 34% solids. The slurry was placed in an Agitair LA500 flotation machine, conditioned for 1 minute after addition of 25 g/t of copper sulphate followed by conditioning for an additional minute with 20 g/t sodium ethyl xanthate and Nalflot H402 frother was added. The slurry was then floated at its natural pH for 8 minutes to generate a concentrate No. 1 and then an additional 16 minutes to generate a concentrate No. 2. The concentrates were recovered, dried, weighed and then assayed for gold content. The results are summarized in Table XX. The results illustrate that removal of a portion of the cyanide containing species from the plant water by extraction results in a 15% absolute improvement in recovery of the gold as compared to the use of untreated plant water.

TABLE XX

| Water Source | Fraction | Fract. Wg. (g) | Au Recovery (%) | Cum. Au Recovery (%) |
| --- | --- | --- | --- | --- |
| Detoxified PlantWater (Run 1) | Concentrate 1 | 59.4 | 77.95 | 77.95 |
| | Concentrate 2 | 25.8 | 4.65 | 82.61 |
| | Tails | 916.2 | 17.39 | 100 |
| Detoxified PlantWater (Run 2) | Concentrate 1 | 61.0 | 83.15 | 83.15 |
| | Concentrate 2 | 18.9 | 3.01 | 86.15 |
| | Tails | 922.1 | 13.85 | 100 |
| PlantWater after Extraction | Concentrate 1 | 41.0 | 65.46 | 65.46 |
| | Concentrate 2 | 26.9 | 10.20 | 75.65 |
| | Tails | 931.7 | 24.35 | 100 |
| PlantWater (Untreated) | Concentrate 1 | 15.9 | 56.10 | 56.10 |
| | Concentrate 2 | 16.7 | 4.25 | 60.34 |
| | Tails | 967.0 | 39.66 | 100 |

What is claimed is:

1. In a process of flotation comprising dispersing a finely divided ore in a recycled aqueous process stream to provide a finely divided pulp in water containing a frothing or foaming agent, and introducing air into the finely divided pulp thereby providing a broth, with minerals having an affinity for gas bubbles, rising to the surface of the broth, thereby separating the minerals from those components of the ore which are wetted by water, the improvement wherein the recycled aqueous process stream is an aqueous alkaline process stream from which toxic cyanide ion and anionic metal cyanide complexes of metals selected from the group consisting of copper, zinc, mercury, cadmium and nickel, and anions of a metal selected from the group consisting of arsenic and selenium have been removed from the aqueous process stream by contacting an aqueous, alkaline solution containing said toxic cyanide anion, or anionic cyanide metal complex or anion of arsenic or selenium with a guanidine extractant, which is capable of being protonated at a pH of 9 or above, to the point where said aqueous alkaline solution has a pH of about 7.5 to 10, thereby removing a major portion of said toxic cyanide ion, or anionic metal cyanide complex or anion of arsenic or selenium from the alkaline solution.

2. The process of claim 1 wherein said extractant which is capable of being protonated at a pH of 9 or above is a guanidine compound of the formula I

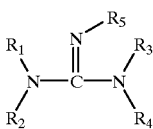

I wherein $R_1$ through $R_5$ are selected from the group consisting of H, and aromatic and aliphatic hydrocarbon groups containing from 1–25 carbon atoms, wherein the total number of carbon atoms in the total of $R_1$–$R_5$ is at least 12 and at least one of $R_1$ through $R_5$ contains at least 6 carbon atoms.

3. The process as defined in claim 2, wherein said guanidine compound is N,N'bis(cyclohexyl)-N"-isotridecylguanidine.

4. The process of claim 1, wherein said extractant is a solid support phase having adsorbed thereon a guanidine compound of the formula I

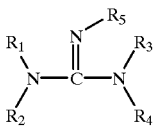

I wherein $R_1$ through $R_5$ are selected from the group consisting of H, and aromatic and aliphatic hydrocarbon groups containing from 1–25 carbon atoms, wherein the total number of carbon atoms in the total of $R_1$–$R_5$ is at least 12 and at least one of $R_1$ through $R_5$ contains at least 6 carbon atoms.

5. The process as defined in claim 4, wherein said solid support phase is selected from the group consisting of activated carbon and a styrene-divinylbenzene resin.

6. A process as defined in claim 5, wherein said guanidine compound is N,N'bis(cyclohexyl)-N"-isotridecyl guanidine.

7. An improved process for removing toxic, cyanide ion and anionic metal cyanide complexes of a metal selected from the group consisting of copper, zinc, mercury, cadmium and nickel, and anions of a metal selected from the group consisting of arsenic and selenium from an alkaline solution containing said toxic cyanide ion, or anionic metal cyanide complex, or anion of arsenic or selenium comprising contacting said aqueous alkaline solution with an extractant, which is capable of being protonated at a pH of 9 or above, to the point where said aqueous alkaline solution has a pH of from about 7.5 to 10, thereby removing a major portion of said toxic cyanide ion, or anionic metal cyanide complex or anion of arsenic or selenium, stripping from the extractant the cyanide ion and the toxic metal cyanide complexes thereby forming a concentrate, and recovering the metal species from said concentrate.

8. A process as defined in claim 7, wherein the metal species is recovered by electrowinning.

9. A process as defined in claim 8, wherein electrolyte flow in electrowinning is parallel to the cathode in the electrowinning cell.

10. A process as defined in claim 9 wherein the electrowinning cell comprises a thin walled cylindrical tube cathode and an anode in a rod form positioned at the axis of the cylindrical tube with inlet and outlet means positioned perpendicular to the tube axis and tangential to the tube surface whereby a spiral motion is imparted to the electrolyte flowing through the tube.

11. A process as defined in claim 10 wherein the cathode and anode are separated by a cation exchange membrane.

12. A process as defined in claim 10, wherein said anode is a carbon rod.

13. A process as defined in claim 10 wherein the electrolyte will pass longitudinally along the axis of the cell at a velocity in the range of about 0.5 to about 10 meters per minute.

14. A process as defined in claim 13 wherein the velocity is in the range of about 6 to about 8.5 meters per minute.

15. A process as defined in claim 14 wherein the volumetric flow rate of electrolyte is between about 4 to about 80 liters per minute.

16. The process of claim 7 wherein said extractant which is capable of being protonated at a pH of 9 or above is a guanidine compound of the formula I

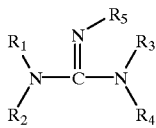

wherein $R_1$ through $R_5$ are selected from the group consisting of H, and aromatic and aliphatic hydrocarbon groups containing from 1–25 carbon atoms, wherein the total number of carbon atoms in the total of $R_1$–$R_5$ is at least 12 and at least one of $R_1$ through $R_5$ contains at least 6 carbon atoms.

17. The process as defined in claim 16, wherein said guanidine compound is N,N'bis(cyclohexyl)-N"-isotridecylguanidine.

18. The process of claim 7 wherein said extractant which is capable of being protonated at a pH of 9 or above is a mixture of a quaternary amine and an alkyl phenol.

19. The process of claim 18 wherein said mixture is comprised of tri($C_8$–$C_{10}$)methyl ammonium chloride and an alkylphenol selected from the group consisting of nonylphenol and dodecylphenol.

20. The process of claim 7 wherein said extractant which is capable of being protonated at a pH of 9 or above is a composition comprising a styrene-divinylbenzene resin functionalized with a compound of the formula I

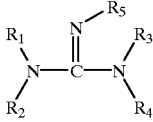

wherein $R_1$ through $R_5$ are selected from the group consisting of H, and aromatic and aliphatic hydrocarbon groups containing from 1–25 carbon atoms.

21. The process of claim 7 wherein said extractant is a solid support phase having adsorbed thereon a guanidine compound of the formula I

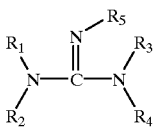

wherein $R_1$ through $R_5$ are selected from the group consisting of H, and aromatic and aliphatic hydrocarbon groups containing from 1–25 carbon atoms, wherein the total number of carbon atoms in the total of $R_1$–$R_5$ is at least 12 and at least one of $R_1$ through $R_5$ contains at least 6 carbon atoms.

22. The process as defined in claim 21 wherein said solid support phase is selected from the group consisting of activated carbon and a sytrene-divinylbenzene resin.

23. A process as defined in claim 22, wherein said guanidine compound is N,N'-bis(cyclohexyl)-N"-isotridecyl guanidine.

* * * * *